US008750646B2

(12) United States Patent
Yoshimura

(10) Patent No.: US 8,750,646 B2
(45) Date of Patent: Jun. 10, 2014

(54) PROJECTOR AND CONTROL METHOD FOR THE PROJECTOR

(71) Applicant: Seiko Epson Corporation, Tokyo (JP)

(72) Inventor: Jun Yoshimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 13/623,651

(22) Filed: Sep. 20, 2012

(65) Prior Publication Data

US 2013/0083058 A1    Apr. 4, 2013

(30) Foreign Application Priority Data

Sep. 30, 2011  (JP) ................. 2011-217046

(51) Int. Cl.
*G06K 9/32*  (2006.01)
(52) U.S. Cl.
USPC ........................................... 382/293
(58) Field of Classification Search
USPC ............... 382/173, 282, 293; 345/647
See application file for complete search history.

(56) References Cited

U.S. PATENT DOCUMENTS

| 6,195,102 | B1 | 2/2001 | McNeil et al. | |
| 6,525,772 | B2 * | 2/2003 | Johnson et al. | 348/383 |
| 6,999,133 | B2 | 2/2006 | Krogstad et al. | |
| 7,039,253 | B2 * | 5/2006 | Matsuoka et al. | 382/295 |
| 7,121,667 | B2 | 10/2006 | Moriwake et al. | |
| 7,679,690 | B2 | 3/2010 | Krogstad et al. | |
| 7,855,753 | B2 | 12/2010 | Krogstad et al. | |
| 7,857,461 | B2 * | 12/2010 | Kondo et al. | 353/69 |
| 8,089,506 | B2 * | 1/2012 | Takayama et al. | 348/42 |

FOREIGN PATENT DOCUMENTS

| JP | 9-106453 A | 4/1997 |
| JP | 3258794 B | 2/2002 |
| JP | 3764972 B | 4/2006 |
| JP | 3845386 B | 11/2006 |
| JP | 4374994 B | 12/2009 |
| JP | 4583823 B | 11/2010 |

* cited by examiner

*Primary Examiner* — Phuoc Tran
(74) *Attorney, Agent, or Firm* — ALG Intellectual Property, LLC

(57) ABSTRACT

A projector is disclosed. The projector divides image data, which should be displayed, into a plurality of quadrilateral regions, displays the vertexes of the divided quadrilateral regions to be superimposed on the image data, causes a user to select one of the displayed vertexes as a selected control point, causes the user to move the selected control point, deforms the quadrilateral regions including the selected control point before the movement as one of the vertexes into a shape including, in vertexes, the moved selected control point, and corrects image data corresponding to the quadrilateral regions before the deformation to be fit in the deformed quadrilateral regions.

13 Claims, 11 Drawing Sheets

PROJECTOR AND CONTROL METHOD FOR THE PROJECTOR

BACKGROUND

The entire disclosure of Japanese Patent Application No. 2011-217046, filed Sep. 30, 2011, is expressly incorporated by reference herein.

1. Technical Field

The present invention relates to a projector and a control method for the projector.

2. Related Art

In the past, there is known a method of geometrically correcting, on a user interface screen of a computer, a projected image projected from a projector (Japanese Patent No. 3845386).

However, in the correcting method disclosed in Japanese Patent No. 3845386, a computer incorporating a correction application has to be used in order to geometrically correct the projected image of the projector. Therefore, the projector alone cannot correct the projected image. When correcting an image, a user has to correct the image while comparing a display screen (image) of the computer and a projected image projected from the projector. Therefore, there is a demand for a projector that alone can perform geometrical correction (shape correction) of a projected image with high operability.

SUMMARY

An advantage of some aspects of the invention is to solve at least a part of the problems described above, and the invention can be implemented as the following forms or application examples.

An application example of the invention is directed to a projector including: a first display control unit that divides image data, which should be displayed, into a plurality of quadrilateral regions and that performs control to display the vertexes of the quadrilateral regions to be superimposed on the image data; an operation receiving unit that receives input operation; a selecting unit that causes a user to select one of the vertexes as a selected control point; a moving unit that causes the user to move the selected control point on the basis of the input operation; and an image correcting unit that deforms the quadrilateral regions including the selected control point before the movement as one of the vertexes into a shape including, in vertexes, the selected control point moved by the moving unit and corrects image data corresponding to the quadrilateral regions before the deformation to be fit in the deformed quadrilateral regions.

With such a projector, the user can geometrically correct image data, which should be projected, by moving the selected control point (vertex). The projector projects image light based on the corrected image data. Therefore, the projector alone can perform geometrical shape correction of the image data.

The first display control unit can also display the sides of the quadrilateral regions. Consequently, since grid-like lines are displayed on the image data, visibility of the quadrilateral regions is improved. The user can easily perform geometrical correction of the image data.

The first display control unit can change the size of the quadrilateral regions. Consequently, the user can change the size of the quadrilateral regions to a desired size and geometrically correct the image data.

The first display control unit can change a display color of the sides of the quadrilateral regions. Consequently, according to the image data, the user can change a color of the sides of the quadrilateral regions to a display color having high visibility.

The first display control unit can display the selected control point different from a state before the selection. Consequently, the user can recognize that the selected control point is selected.

The projector can display a first OSD (on-screen display) image for urging the selection of the selected control point. Consequently, the user can recognize the necessity of selecting the selected control point.

The projector can change a display position of the first OSD image in the image data not to overlap the selected control point. Consequently, the user can prevent overlap of the selected control point and the first OSD image.

The projector can display a second OSD image for urging moving operation for the selected control point. Consequently, the user can recognize that the selected control point can be moved (adjusted in position).

The projector can display, on the second OSD image, a moving distance from a default position (an initial position) of the selected control point. Consequently, the user can recognize to which degree the selected control point is moved.

The first display control unit can hide at least the vertexes or the sides of quadrilateral regions. Consequently, it is possible to perform the geometrical correction of the image data in a state without grid-like lines and points.

The first display control unit can change the image data to single-color image data. Consequently, it is possible to improve visibility of the sides of the quadrilateral regions during the geometrical correction of the image data.

When the projector and a control method for the projector according to the application example of the invention are implemented using a computer included in the projector, the application example of the invention explained above can also be configured in a form of, for example, a computer program for realizing the functions explained above or a recording medium in which the computer program is recorded to be readable by the computer. As the recording medium, various media readable by the computer can be used, such as a flexible disk, a HDD (Hard Disk Drive), a CD-ROM (Compact Disc Read Only Memory), a DVD (Digital Versatile Disc), a Blu-ray Disc (registered trademark), a magneto-optical disc, a nonvolatile memory card, an internal storage device of the projector (a semiconductor memory such as a RAM (Random Access Memory) or a ROM (Read Only Memory), and an external storage device (a USB memory, etc.).

BRIEF DESCRIPTION OF THE DRAWINGS

The invention will be described with reference to the accompanying drawings, wherein like numbers reference like elements.

FIGS. 4A to 4C are explanatory diagrams of points and grid lines on a quadrilateral selected according to a number-of-points setting menu image, wherein FIG. 4A is an explanatory diagram of "3×3" points, FIG. 3B is an explanatory diagram of "5×5 points", and FIG. 3C is an explanatory diagram of "9×9" points.

FIGS. 6A and 6B are explanatory diagrams of a point selection image, wherein FIG. 6A is an explanatory diagram of the point selection image in which a control point guide is present in an upper part and FIG. 6B is an explanatory diagram of the point selection image in which the control guide point is present in a lower right part.

FIGS. 8A to 8C are explanatory diagrams of a point adjustment image, wherein FIG. 8A is an explanatory diagram of a state in which a background image is displayed, FIG. 8B is an explanatory diagram of a state in which the background image is changed to a single color, and FIG. 8C is an explanatory diagram of a state in which grid lines and a selected control point guide are erased.

DESCRIPTION OF EXEMPLARY EMBODIMENTS

An embodiment is explained below.

Embodiment

In this embodiment, a projector that can correct the shape of a projected image according to operation by a user is explained.

Figure 1:
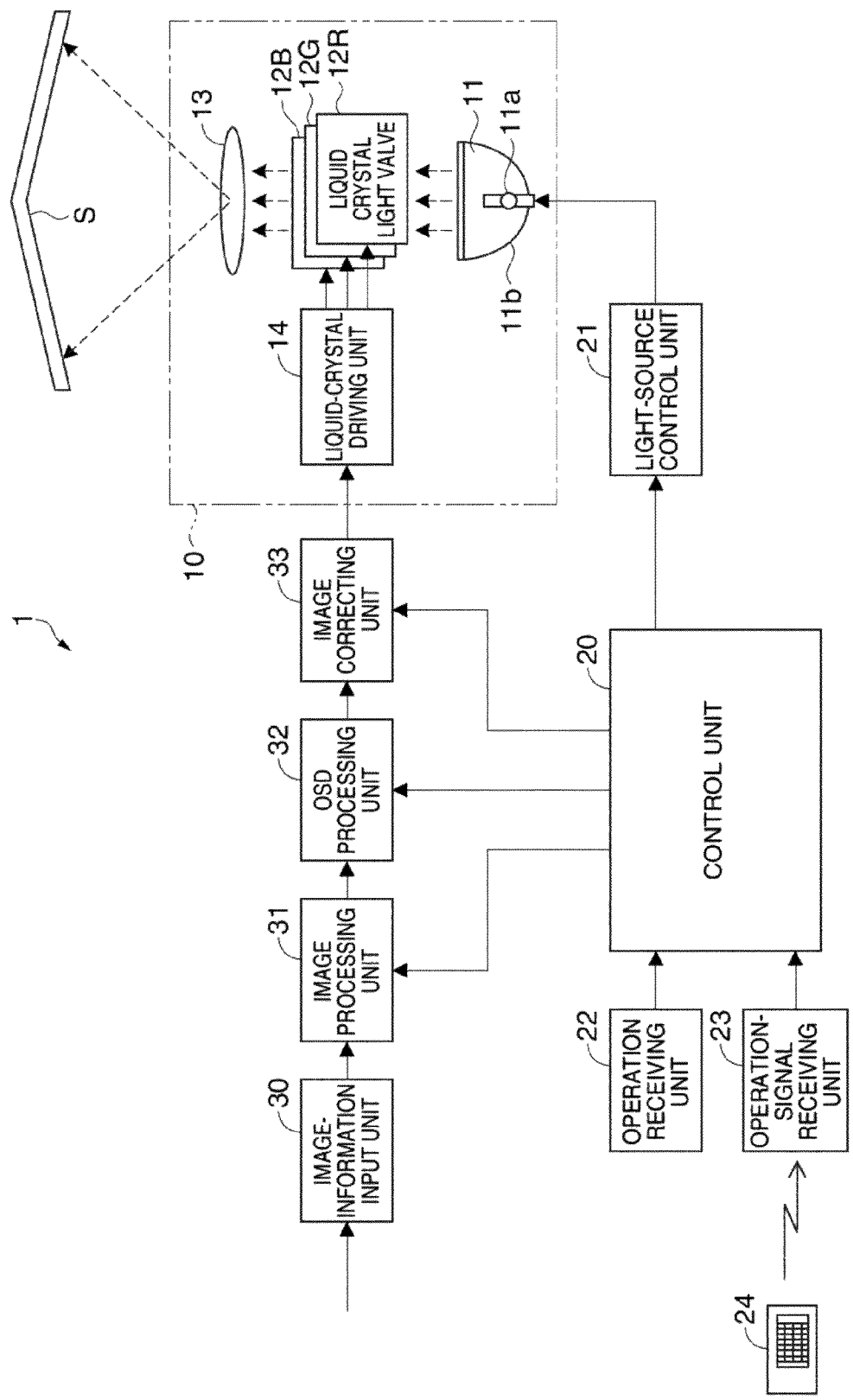
FIG. 1 is a block diagram showing a schematic configuration of a projector according to an embodiment.

FIG. 1 is a block diagram showing a schematic configuration of the projector according to this embodiment. An internal configuration of the projector is explained with reference to FIG. 1.

As shown in FIG. 1, a projector 1 includes an image projecting unit 10, a control unit 20, a light-source control unit 21, an operation receiving unit 22, an operation-signal receiving unit 23, a remote controller 24, an image-information (data) input unit 30, an image processing unit 31, an OSD processing unit 32, and an image correcting unit 33.

The image projecting unit 10 includes a light source device 11 functioning as a light source, three liquid crystal light valves 12R, 12G, and 12B functioning as light modulating devices, a projection lens 13 functioning as a projection optical system, and a liquid-crystal driving unit 14. The image projecting unit 10 modulates, with the liquid crystal light valves 12R, 12G, and 12B, light emitted from the light source device 11 into image light, projects the image light from the projection lens 13, and displays an image on a projection surface S. In this embodiment, the projection surface S is formed in a chevron shape.

The light source device 11 includes a light source lamp 11a of a discharge type including an extra-high pressure mercury lamp or a metal halide lamp and a reflector 11b that reflects light, which is emitted by the light source lamp 11a, to the liquid crystal light valves 12R, 12G, and 12B side. Light emitted from the light source device 11 is converted into light having a substantially uniform luminance distribution by a not-shown integrator optical system. After the light is separated into color light components of red (R), green (G), and blue (B), which are the three primary colors of light, by a not-shown color separation optical system, the color light components are respectively made incident on the liquid crystal light valves 12R, 12G, and 12B.

The liquid crystal light valves 12R, 12G, and 12B include liquid crystal panels or the like, in each of which liquid crystal is encapsulated between a pair of transparent substrates. The liquid crystal light valves 12R, 12G, and 12B each includes a rectangular pixel region in which plural pixels (not shown) are arrayed in a matrix shape. A driving voltage can be applied to the liquid crystal for each of the pixels. When the liquid-crystal driving unit 14 applies a driving voltage corresponding to input image data to the pixels, the pixels are set to light transmittance corresponding to the image data. Therefore, the light emitted from the light source device 11 is modulated by being transmitted through the pixel regions of the liquid crystal light valves 12R, 12G, and 12B. Image light corresponding to the image data is formed for each of color lights. The formed image lights of the respective colors are combined for each of the pixels by a not-shown color combination optical system to change to color image light. Thereafter, the color image light is enlarged and projected by the projection lens 13.

The control unit 20 includes a CPU (Central Processing Unit), a RAM (Random Access Memory) used for temporary storage of various data and the like, and a nonvolatile ROM (Read Only Memory). The CPU operates according to a control program stored in the ROM, whereby the control unit 20 collectively controls the operation of the projector 1. In other words, the control unit 20 functions as a computer.

The light-source control unit 21 controls lighting of the light source device 11 (the light source lamp 11a) on the basis of an instruction of the control unit 20. Specifically, the light-source control unit 21 can turn on the light source lamp 11a by supplying predetermined electric power to the light source lamp 11a and turn off the light source lamp 11a by stopping the supply of the electric power. The light-source control unit 21 can adjust the luminance (brightness) of the light source lamp 11a by controlling, on the basis of an instruction of the control unit 20, electric power supplied to the light source lamp 11a.

The operation receiving unit 22 receives input operation from the user. The operation receiving unit 22 includes plural operation keys used by the user to give various instructions to the projector 1. The operation keys included in the operation receiving unit 22 include a power supply key for switching ON and OFF of a power supply, an input switching key for switching an input image signal, a menu key for switching display and non-display of a menu image for performing various kinds of setting, four direction keys (an upward direction key, a downward direction key, a left direction key, and a right direction key) corresponding to up and down and left and right, a Determine key for determining the various kinds of setting, an ESC (Escape) key used for, for example, cancellation of operation, and a Default key for resetting the various kinds of setting to initial values. When the user operates (depresses) the various operation keys of the operation receiving unit 22, the operation receiving unit 22 receives input operation of the operation keys and outputs an operation signal corresponding to operation content of the user to the control unit 20.

Like the operation receiving unit 22, the remote controller 24 includes plural operation keys. When the user operates the various operation keys of the remote controller 24, the remote controller 24 emits an operation signal of an infrared ray or the like corresponding to operation content of the user. The operation-signal receiving unit 23 receives the operation signal and transmits the operation signal to the control unit 20. The operation-signal receiving unit 23 that receives the operation signal of the operation receiving unit 22 or the remote controller 24 is equivalent to the operation receiving unit in the appended claims.

The image-information (data) input unit 30 includes plural input terminals. Image data of various forms are input to the input terminals from a not-shown external image supply apparatus such as a video player or a personal computer. The image-information input unit 30 outputs the input image data to the image processing unit 31.

The image processing unit 31 converts the image data input from the image-information input unit 30 into image data representing the gradation of the pixels of the liquid crystal light valves 12R, 12G, and 12B, i.e., image data for specifying a driving voltage applied to the pixels. Further, the image processing unit 31 applies, on the basis of an instruction of the control unit 20, for example, image quality adjustment processing for adjusting image quality such as brightness, contrast, sharpness, and a hue to the converted image data. The image processing unit 31 outputs the image data after the processing to the OSD processing unit 32.

The OSD processing unit 32 performs, on the basis of an instruction of the control unit 20, processing for displaying an OSD (on-screen display) image such as a menu image or a message image to be superimposed on the input image data. The OSD processing unit 32 includes a not-shown OSD memory. The OSD processing unit 32 has stored in the OSD memory OSD image information representing figures, fonts, and the like for forming an OSD image. When the control unit 20 instructs superimposition of an OSD image, the OSD processing unit 32 reads out necessary OSD image information from the OSD memory and combines the OSD image information with image data input from the image processing unit 31 such that the OSD image is superimposed in a predetermined position on the input image data. The image data combined with the OSD image information is output to the image correcting unit 33. When an instruction for superimposing an OSD image is not received from the control unit 20, the OSD processing unit 32 directly outputs the image data, which is input from the image processing unit 31, to the image correcting unit 33.

In this embodiment, the OSD processing unit 32 displays grid lines, a control point guide, a selected control point guide, a control point selection OSD image, a control point adjustment OSD image, and the like for performing point correction explained below.

The image correcting unit 33 performs processing ("point correction" processing) for correcting, for example, a distortion of a projected image caused, for example, when there is unevenness on the projection surface S and a shift of a projected image caused by stack projection or edge blending. Specifically, the image correcting unit 33 divides an input image into plural quadrilateral regions and performs correction processing for each of the quadrilateral regions on the basis of an instruction of the control unit 20.

The image correcting unit 33 receives position information of the vertexes of the adjusted (deformed) quadrilateral regions from the control unit 20. The image correcting unit 33 forms quadrilateral regions on the basis of the vertexes. The image correcting unit 33 is equivalent to the quadrilateral dividing unit. Further, the image correcting unit 33 corrects image data (input image data) corresponding to the quadrilateral regions before the deformation to be fit in the deformed quadrilateral regions. The image correcting unit 33 outputs the corrected image data to the liquid-crystal driving unit 14. Consequently, it is possible to form an input image having a shape for offsetting a distortion in the pixel regions of the liquid crystal light valves 12R, 12G, and 12B. The image correcting unit 33 sets pixels on the outer side of regions for image formation in the pixel regions to a pixel value of black, i.e., a pixel value for minimizing light transmittance. In this way, the image correcting unit 33 corrects image data input from the OSD processing unit 32.

When the control unit 20 does not instruct the image correcting unit 33 to correct a distortion, the image correcting unit 33 directly outputs image data, which is input from the OSD processing unit 32, to the liquid-crystal driving unit 14. In this case, the entire pixel regions are regions for image formation. Image data (input image data) is formed over the entire pixel regions.

When the liquid-crystal driving unit 14 drives the liquid crystal light valves 12R, 12G, and 12B according to the image data input from the image correcting unit 33, light is modulated into image light corresponding to the image data by the liquid crystal light valves 12R, 12G, and 12B. The image light is projected from the projection lens 13.

Point correction by the projector 1 is explained.

As explained above, the projector 1 according to this embodiment can perform, with the image correcting unit 33, geometrical correction processing for an image. Specifically, when the user selects a point correction menu using the menu key included in the operation receiving unit 22 or the remote controller 24, the projector 1 displays a point correction menu image. When the user selects an item of adjustment start in the point correction menu image, the projector 1 displays a point selection image for causing the user to select a control point for correcting a distortion. When the user selects a desired control point in the point selection image, the projector 1 displays a point adjustment image in which the control point can be moved (adjusted in position). When the user operates the direction keys in the point adjustment image, the projector 1 moves the control point to correct the distortion. In this embodiment, twenty five control points are arranged on an input image.

Figure 2:
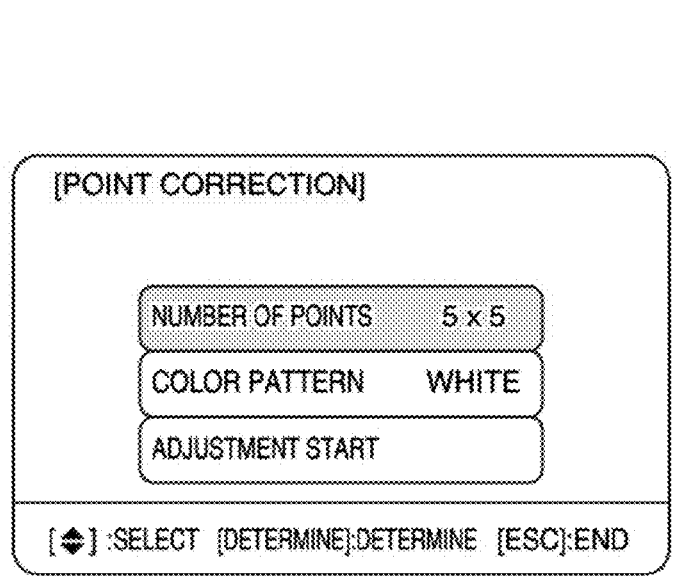
FIG. 2 is an explanatory diagram of a point correction menu image of the projector.

FIG. 2 is an explanatory diagram of the point correction menu image of the projector 1 according to this embodiment.

As shown in FIG. 2, in a point correction menu image M1, "number of points" and a current setting value for setting the number of points, "color pattern" and a current setting value for setting a display color of grid lines, and "adjustment start" for starting adjustment are displayed as items. In FIG. 2, a background color of the "number of points" is different from a background color of the other items. This indicates that the item "number of points" is selected. The point correction menu image M1 is displayed by the OSD processing unit 32.

In a state in which the point correction menu image M1 is displayed, the user can select a desired item by operating the upward and downward direction keys. The user operates the Determine key in a state in which the desired item is selected, whereby selection of an adjustment item is decided and a setting image concerning the item can be displayed. The user can end the display of the point correction menu image M1 by operating the ESC key.

When the user selects the "number of points" in the point correction menu image M1, a number-of-points setting menu image is displayed.

Figure 3:
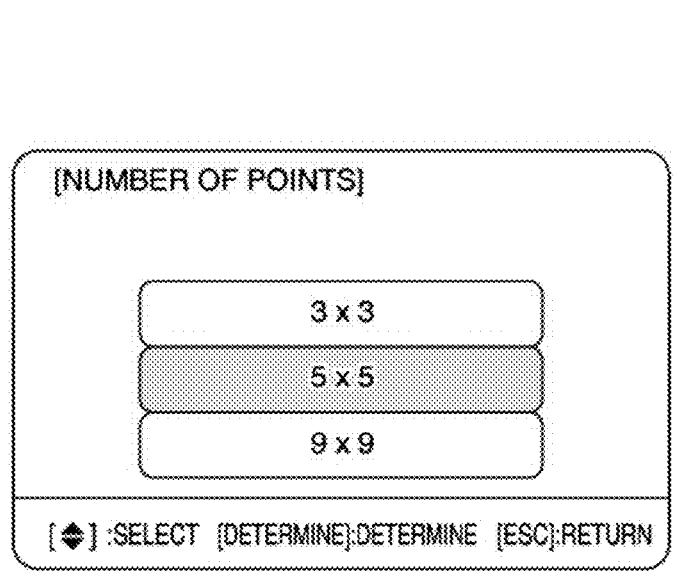
FIG. 3 is an explanatory diagram of a number-of-points setting menu image.

FIG. 3 is an explanatory diagram of the number-of-points setting menu image.

As shown in FIG. 3, in the number-of-points setting menu image M2, items "3×3", "5×5", and "9×9" are displayed as candidates of selection of the number of points. In FIG. 3, a background color of "5×5" is different from a background color of the other items. This indicates that the item is selected. The number-of-points setting menu image M2 is displayed by the OSD processing unit 32.

Figure 4A:
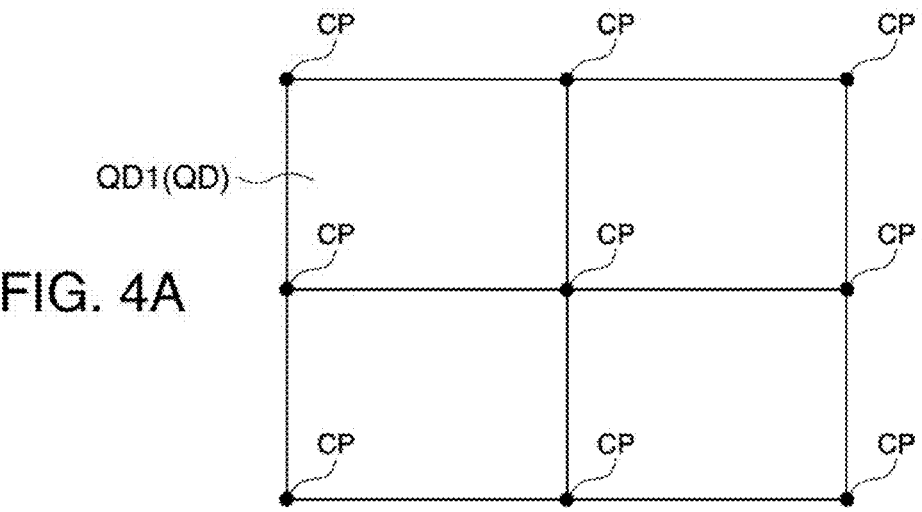
Figure 4B:
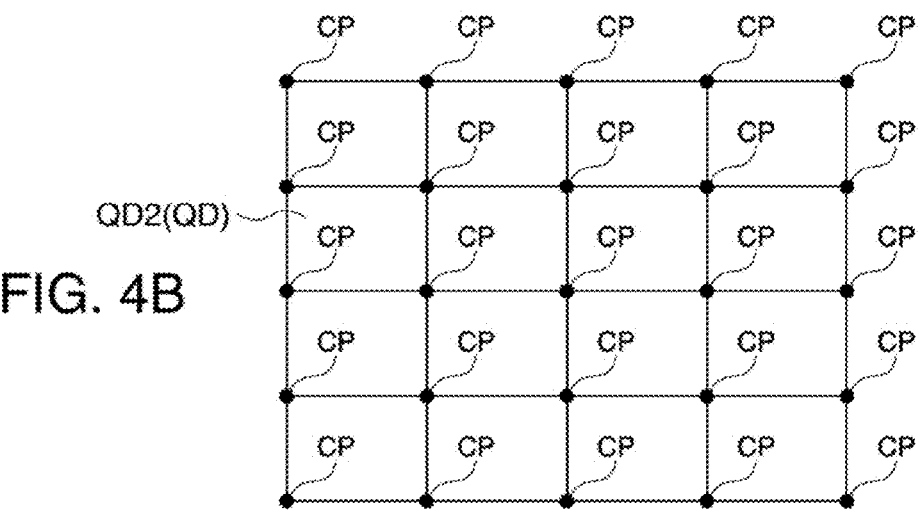
Figure 4C:
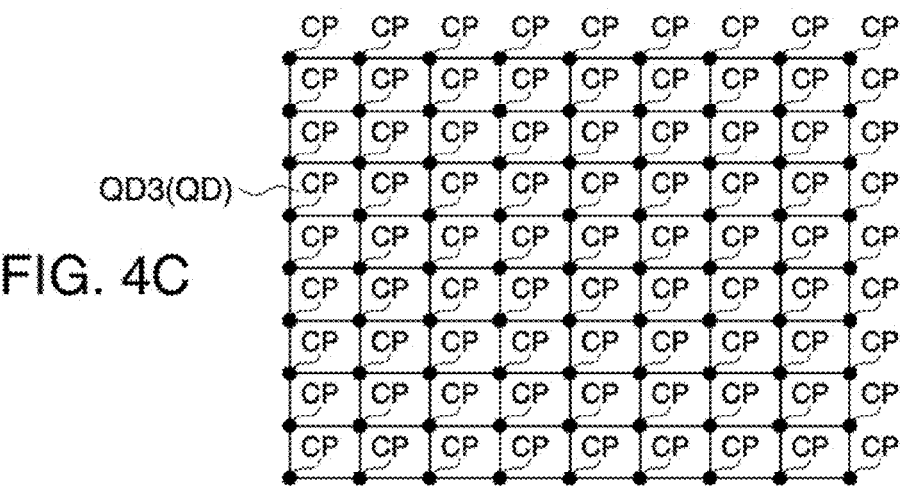

FIGS. 4A to 4C are explanatory diagrams of points and grid lines on a quadrilateral selected by the number-of-points setting menu image M2. FIG. 4A is an explanatory diagram of "3×3" points, FIG. 3B is an explanatory diagram of "5×5 points", and FIG. 3C is an explanatory diagram of "9×9" points. The points (also referred to as "control points CP") represent vertexes formed when an input image is divided into plural quadrilateral regions. As shown in FIG. 4A, when the input image is divided into four quadrilateral regions QD1 (QD), the number of the control points CP is "3×3". As shown in FIG. 4B, when the input image is divided into sixteen quadrilateral regions QD2 (QD), the number of the control points CP is "5×5". As shown in FIG. 4C, when the input image is divided into sixty-four quadrilateral regions QD3 (QD), the number of the control points CP is "9×9".

Referring back to FIG. 3, in a state in which the number-of-points setting menu image M2 is displayed, the user can select a desired item by operating the upward and downward direction keys. The user can decide selection of the number of points, end the display of the number-of-points setting menu image M2, and return to the point correction menu image M1 by operating the Determine key in a state in which the desired item is selected. The user can end the display of the number-of-points setting menu image M2 and return to the point correction menu image M1 by operating the ESC key.

Referring back to FIG. 2, when the user selects the "color pattern" in the point correction menu image M1, a color pattern setting menu image is displayed.

Figure 5:
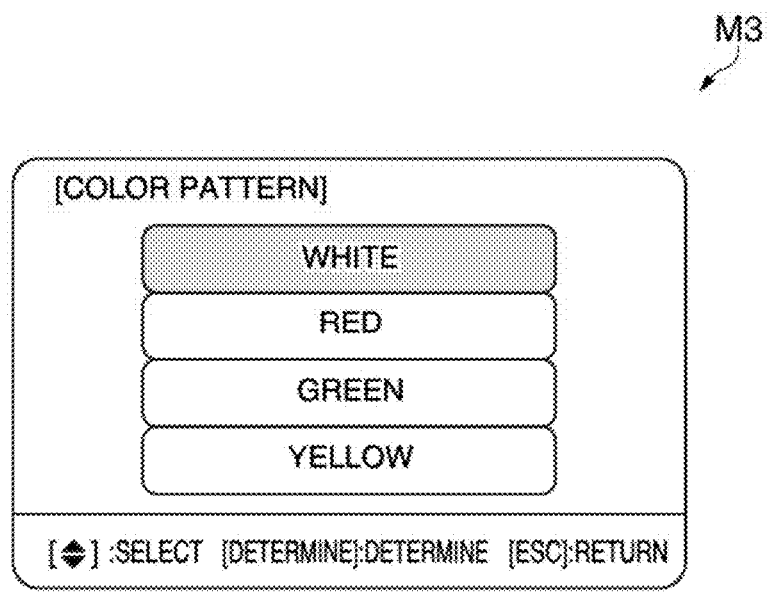
FIG. 5 is an explanatory diagram of a color pattern setting menu image.

FIG. 5 is an explanatory diagram of the color pattern setting menu image.

As shown in FIG. 5, in a color pattern setting menu image M3, items "white", "red", "green", and "yellow", are displayed as candidates of selection of a display color of grid lines in an image to be subjected to point correction. In FIG. 5, a background color of "white" is different from a background color of the other items. This indicates that the item is selected. The color pattern setting menu image M3 is displayed by the OSD processing unit 32.

In a state in which the color pattern setting menu image M3 is displayed, the user can select a desired item by operating the upward and downward direction keys. The user can decide selection of an adjustment item, end the display of the color pattern setting menu image M3, and return to the point correction menu image M1 by operating the Determine key in a state in which the desired item is selected. The user can end the display of the color pattern setting menu image M3 and return to the point correction menu image M1 by operating the ESC key.

Referring back to FIG. 2, when the "adjustment start" is selected in the point correction menu image M1, a point selection image is projected to be superimposed on an input image.

Figure 6A:
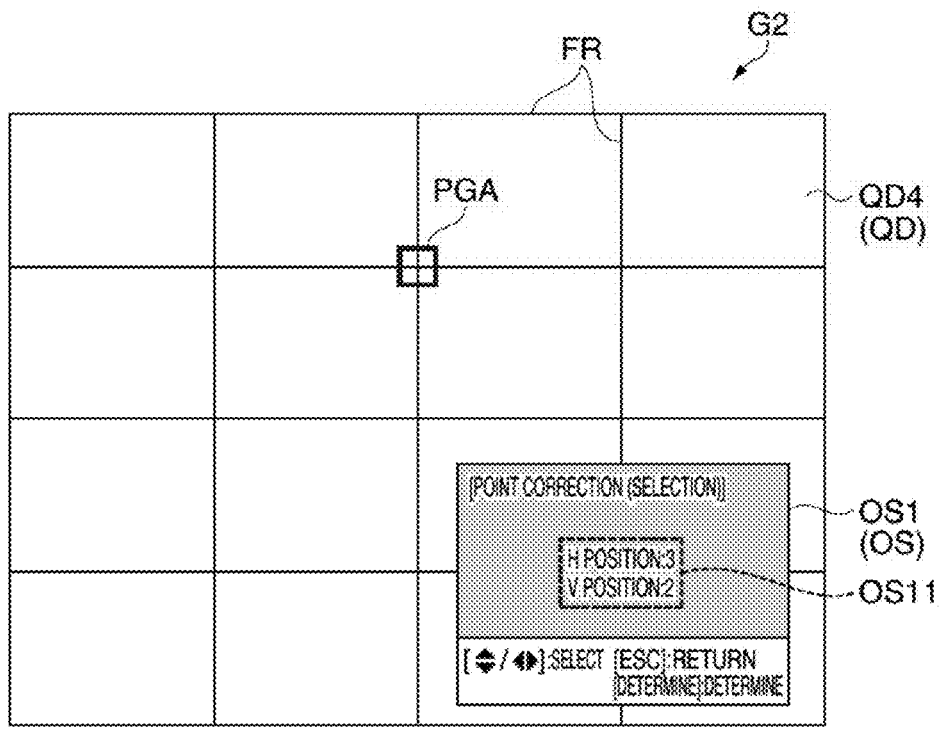
Figure 6B:
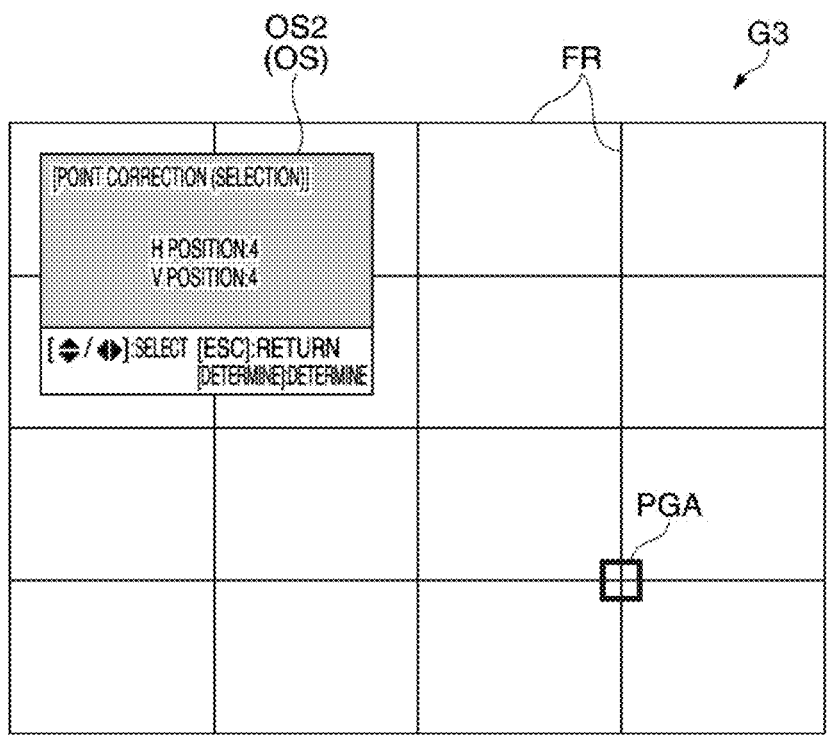

FIGS. 6A and 6B are explanatory diagrams of the point selection image. FIG. 6A is an explanatory diagram of the point selection image in which a control point guide is present in an upper part. FIG. 6B is an explanatory diagram of the point selection image in which the control point guide is present in a lower right part.

As shown in FIG. 6A, in a point selection image G2, the number of the control points CP is "5×5" selected in the number-of-points setting menu image M2. The point selection image G2 is divided into sixteen quadrilateral regions QD4 (QD). The sides of the quadrilateral regions QD4 (QD) are displayed as grid lines FR in the display color set in the color pattern setting menu image M3. The OSD processing unit 32 that displays the grid lines FR and/or the image correcting unit 33 is equivalent to the first display control unit.

In the point selection image G2, a control point guide PGA for pointing at the control points CP is displayed. Further, a control point selection OSD image OS1 (OS) is displayed. The control point selection OSD image OS1 (OS) is equivalent to the first OSD image. The OSD processing unit 32 that displays the control point selection OSD image OS1 (OS) is equivalent to a second display control unit.

In this embodiment, the control point guide PGA is represented as a square that surrounds the control point CP. The control point guide PGA can be moved to any position of the control points CP at "5×5" (twenty-five) points according to operation by the user.

The control point selection OSD image OS1 is an OSD image representing position information OS11 and an operation method of the control point guide PGA. In the position information OS11, "H position", i.e., position information in the horizontal direction and "V position", i.e., position information in the vertical direction are shown. Each of the "H position" and the "V position" is represented by numerical values 1 to 5. The "H position" and the "V position" indicate which of the twenty-five control points the control point guide PGA points at.

In the control point selection OSD image OS1, it is indicated that the user can move the control point guide PGA by operating the upward, downward, left, and right direction keys. Further, it is indicated that the user can decide selection of the control point CP to be adjusted and adjust the position of the control point CP by operating the Determine key in a state in which the position of the control point guide PGA is selected. It is also indicated that the user can end a state in which the point selection image G2 is displayed, i.e., a point correction state by operating the ESC key.

In FIG. 6B, like the point selection image G2, a point selection image G3 is divided into sixteen quadrilateral regions QD. The number of the control points CP is "5×5". As the position information of the control point guide PGA, the "H position" is 4 and the "V position" is 4. At this point, the OSD processing unit 32 displays a control point selection OSD image OS2 (OS) in an upper left position to prevent the control point guide PGA from overlapping the control point selection OSD image OS2 (OS). In this way, the OSD processing unit 32 changes a display position of the control point selection OSD image OS to prevent the control point guide PGA from overlapping the control point selection OSD image OS.

A point adjustment image is explained that is displayed when selection of the control point CP to be adjusted is decided and position adjustment of the control point CP (i.e., the selected control point) is performed in the state in which the point selection image G2 is displayed.

Figure 7:
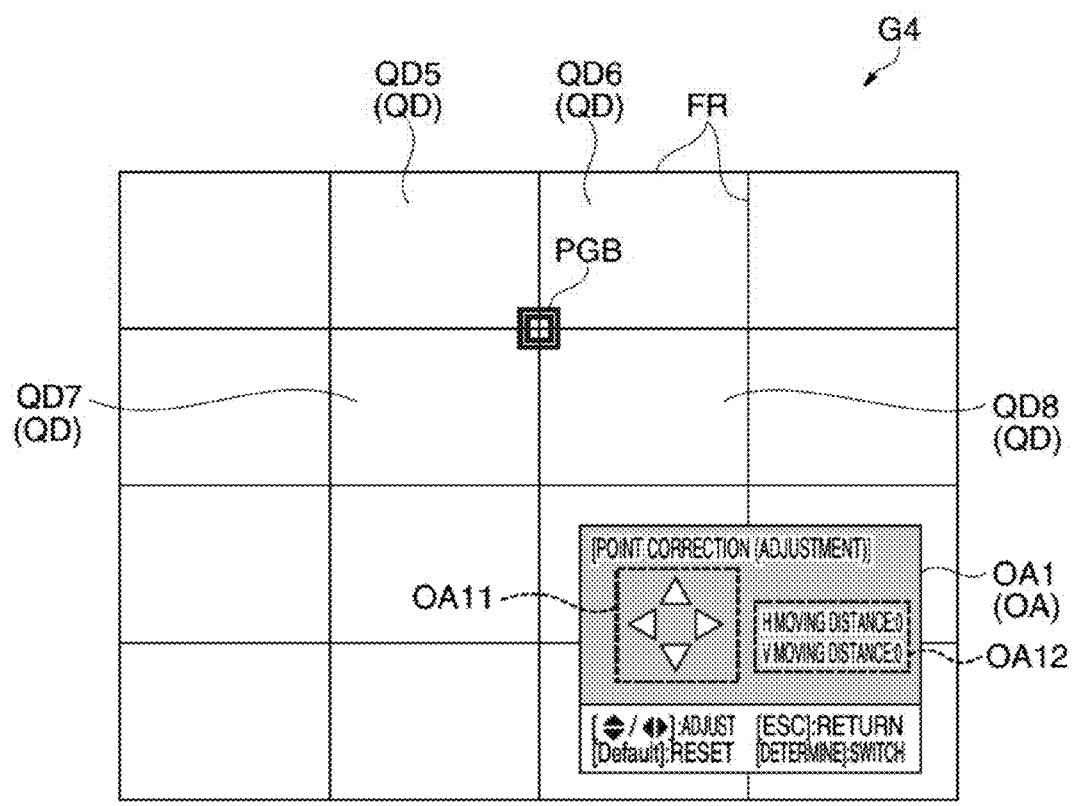
FIG. 7 is an explanatory diagram of a point adjustment image.

FIG. 7 is an explanatory diagram of the point adjustment image.

As shown in FIG. 7, like the point selection image G2, a point adjustment image G4 is divided into sixteen quadrilateral regions QD. The number of the control points CP is "5×5". In the point adjustment image G4, a selected control point guide PGB and a control point adjustment OSD image OA1 (OA) are further displayed. The control point adjustment OSD image OA1 (OA) is equivalent to the second OSD image. The OSD processing unit 32 that displays the control point adjustment OSD image OA1 (OA) is equivalent to a third display control unit.

The selected control point guide PGB represents a state in which selection of the control point guide PGA is decided. In this embodiment, the selected control point guide PGB is displayed as a double square that surrounds the control point CP (the selected control point). The OSD processing unit 32 that displays the selected control point guide PGB is equivalent to the first display control unit as explained above. The quadrilateral regions QD having, as vertexes, the selected control point pointed at by the selected control point guide PGB are QD5, QD6, QD7, and QD8.

The control point adjustment OSD image OA1 is an OSD image representing a moving method and a moving distance of the selected control point selected by the selected control point guide PGB. In the control point adjustment OSD image OA1, a moving direction guide OA11 indicating a direction in which the selected control point pointed at by the selected control point guide PGB can be moved is displayed.

In the control point adjustment OSD image OA1, moving distance information OA12 representing a moving distance from an initial position of the selected control point pointed at by the selected control point guide PGB is displayed. In the moving distance information OA12, "H moving distance", i.e., a moving distance from an initial position in the horizontal direction and "V moving distance", i.e., a moving distance from an initial position in the vertical direction are displayed. As each of the "H moving distance" and the "V moving distance", the number of pixels in the moving distance is displayed. Display content of the "H moving distance" and the "V moving distance" is not limited to the number of pixels.

In the control point adjustment OSD image OA1, it is indicated that the user can adjust the movement of the selected control point by operating the upward, downward, left, and right direction keys. It is indicated that the user can end, by operating the ESC key, a state in which the point adjustment image G4 is displayed and return to the state in which the point selection image G2 is displayed. It is indicated that the user can reset the position of an adjusted control point to an initial position by operating the Default key. Further, it is indicated that the user can switch a display state of the point adjustment image G4 by operating the Determine key.

The switching of the display state of the point adjustment image G4 is explained. The user can change a background image of the point adjustment image G4 to a single color and erase the grid lines FR and the selected control point guide PGB by depressing the Determine key.

Figure 8A:
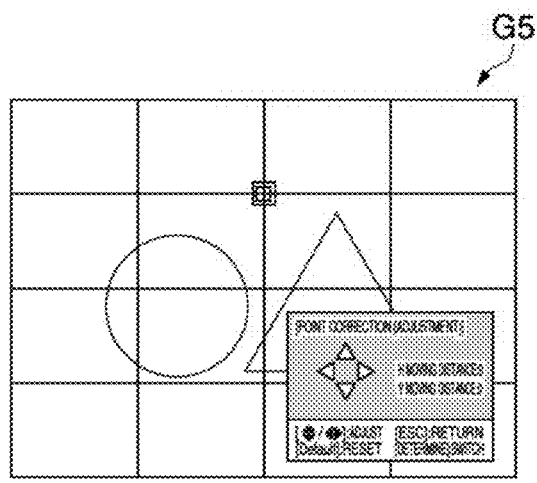
Figure 8B:
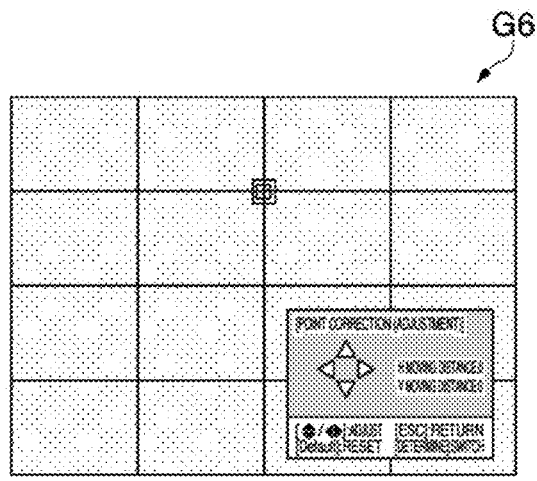
Figure 8C:
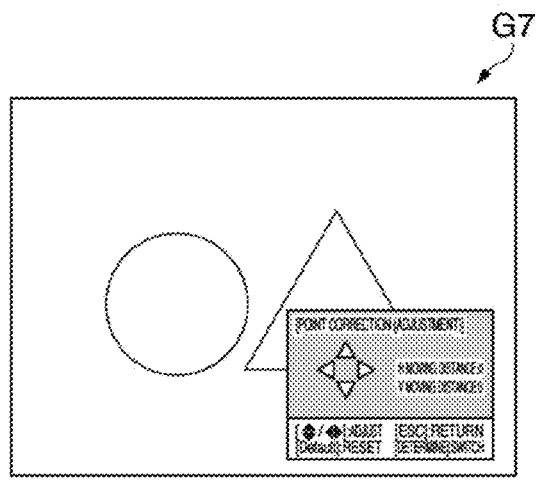

FIGS. 8A to 8C are explanatory diagrams of the point adjustment image. FIG. 8A is an explanatory diagram of a state in which a background image is displayed, FIG. 8B is an explanatory diagram of a state in which the background image is changed to a single color, and FIG. 8C is an explanatory diagram of a state in which the grid lines FR and the selected control point guide PGB are erased.

In a point adjustment image G5 shown in FIG. 8A, an input image "circle" and "triangle" is displayed as a background image. In a point adjustment image G6 shown in FIG. 8B, an input image is not displayed and a single-color background image is displayed. The color of the background image is, for example, blue or black but is not limited to these colors. In a point adjustment image G7 shown in FIG. 8C, the input image "circle" and "triangle" is displayed as a background image. However, the grid lines FR and the selected control point guide PGB are not displayed. In this way, the user can change a display form of the point adjustment image by operating the Determine key. After selecting the selected control point guide PGB, the user can perform finer correction of an image by hiding at least one of the grid lines FR and the selected control point guide PGB in FIG. 8C.

Display performed when the control point CP (i.e., the selected control point) where the selected control point guide PGB is present is moved in the point adjustment image G4 is explained.

Figure 9:
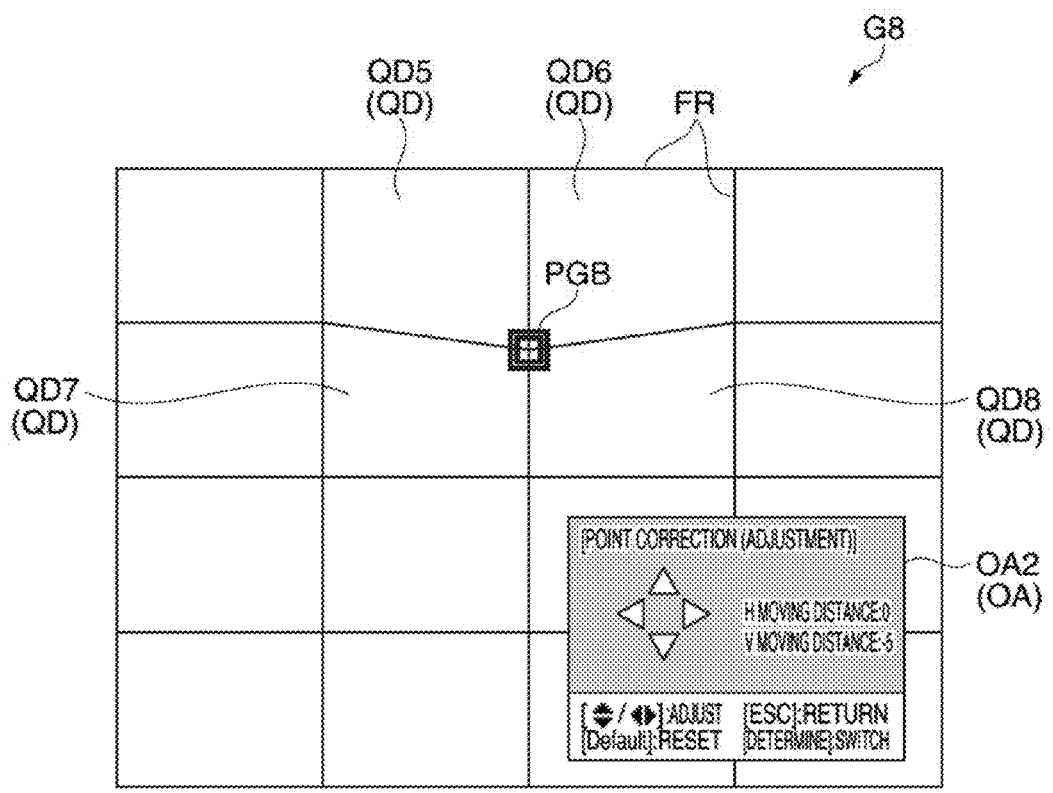
FIG. 9 is an explanatory diagram of a point adjustment image.

FIG. 9 is an explanatory diagram of the point adjustment image.

In a state in which the point adjustment image G4 is displayed, when the user depresses the downward direction key to move the selected control point pointed at by the selected control point guide PGB downward in the image, the projector 1 displays a point adjustment image G8 shown in FIG. 9.

In the point adjustment image G8, the quadrilateral regions QD5, QD6, QD7, and QD8 having the control point CP as vertexes are deformed by the image correcting unit 33 and the grid lines FR are also deformed by the OSD processing unit 32. Image data corresponding to the quadrilateral regions QD5, QD6, QD7, and QD8 before the deformation are corrected by the image correcting unit 33 to be fit in the quadrilateral regions QD5, QD6, QD7, and QD8 after the deformation.

In the moving distance information of the control point adjustment OSD image OA2 (OA), the "H moving distance" is displayed as "0" and the "V moving distance" is displayed as "−5". This indicates a state in which the selected control point moves by five pixels downward in the image. In this way, the user can correct the image data by operating the direction keys in a state in which the point adjustment image is displayed.

Processing in performing point correction using the projector 1 is explained.

Figure 10:
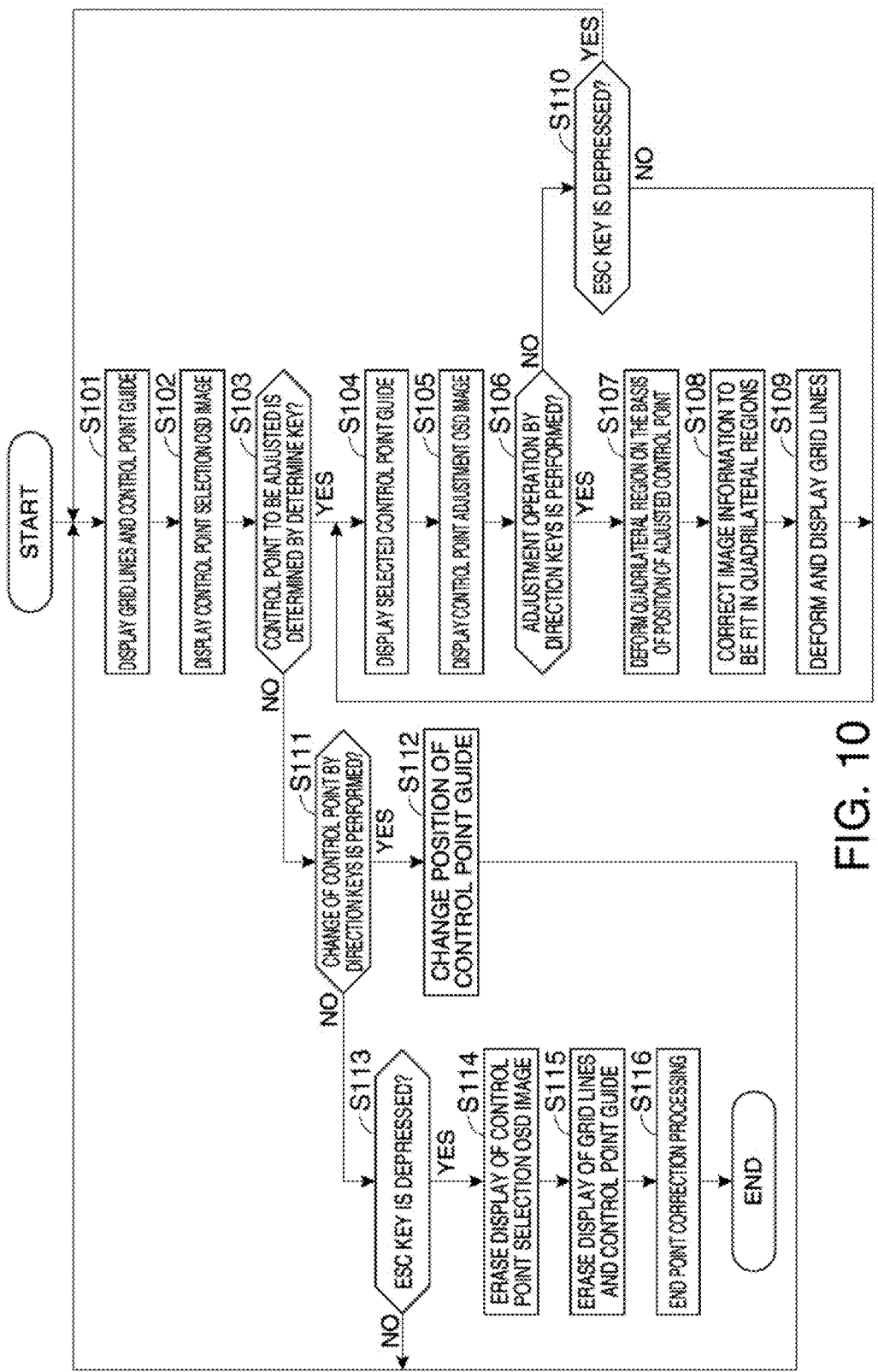
FIG. 10 is a flowchart of processing in performing point correction using the projector.

FIG. 10 is a flowchart of processing in performing point correction using the projector 1 according to this embodiment.

When the "adjustment start" is selected in the point correction menu image M1, the control unit 20 instructs the OSD processing unit 32 to display the grid lines FR and the control point guide PGA based on the number of points and the color pattern (step S101). As an initial position of the control point guide PGA, the "H position" is 1 and the "V position" is 1. The control unit 20 instructs the OSD processing unit 32 to display the control point selection OSD image OS (step S102).

The control unit 20 determines, according to whether the Determine key is depressed, whether the control point CP (the selected control point) to be adjusted is determined (step S103). The control unit 20, the operation receiving unit 22, and the remote controller 24 in causing the user to select the selected control point in this way is equivalent to the selecting unit.

If the control point CP to be adjusted is determined (YES in step S103), the control unit 20 instructs the OSD processing unit 32 to change the control point guide PGA to the selected control point guide PGB (i.e., the control point guide displayed as the double square) and display the selected control point guide PGB (step S104). The control unit 20 instructs the OSD processing unit 32 to erase the control point selection OSD image OS and display the control point adjustment OSD image OA (step S105).

The control unit 20 determines whether adjustment operation for the selected control point by the direction keys is performed (step S106). If the adjustment operation for the selected control point is performed (YES in step S106), the control unit 20 instructs the image correcting unit 33 to deform, on the basis of the position of the adjusted selected control point, the quadrilateral regions QD including the selected control point as one of vertexes (step S107). The control unit 20 and the image correcting unit 33 that move the selected control point are equivalent to the moving unit. The image correcting unit 33 that deforms the quadrilateral regions QD into a shape including the selected control point in vertexes is equivalent to the image correcting unit.

The image correcting unit 33 corrects image data corresponding to the quadrilateral regions QD before the deformation to be fit in the deformed quadrilateral regions QD (step S108). The control unit 20 instructs the OSD processing unit 32 to display the grid lines FR to correspond to the deformed quadrilateral regions QD (step S109). The control unit 20 shifts to step S104.

If the adjustment operation for the selected control point by the direction keys is not performed (NO in step S106), the control unit 20 determines whether the ESC key is depressed (step S110). If the ESC key is not depressed (NO in step S110), the control unit 20 shifts to step S104. If the ESC key is depressed (YES in step S110), the control unit 20 shifts to step S101.

If the control point CP to be adjusted is not determined (NO in step S103), the control unit 20 determines whether the control point CP is changed by the depression of the direction keys (step S111). If the control point CP is changed (YES in step S111), the control unit 20 changes the position of the control point guide PGA (step S112). The control unit 20 shifts to step S101.

If the control point CP is not changed (NO in step S111), the control unit 20 determines whether the ESC key is depressed (step S113). If the ESC key is depressed (YES in step S113), the control unit 20 instructs the OSD processing unit 32 to erase the display of the control point selection OSD image OS (step S114). Further, the control unit 20 instructs the OSD processing unit 32 to erase the display of the grid lines FR and the control point guide PGA (step S115). The control unit 20 ends the point correction processing (step S116).

If the ESC key is not depressed (NO in step S113), the control unit 20 shifts to step S101.

An image subjected to the point correction explained above is explained.

Figure 11:
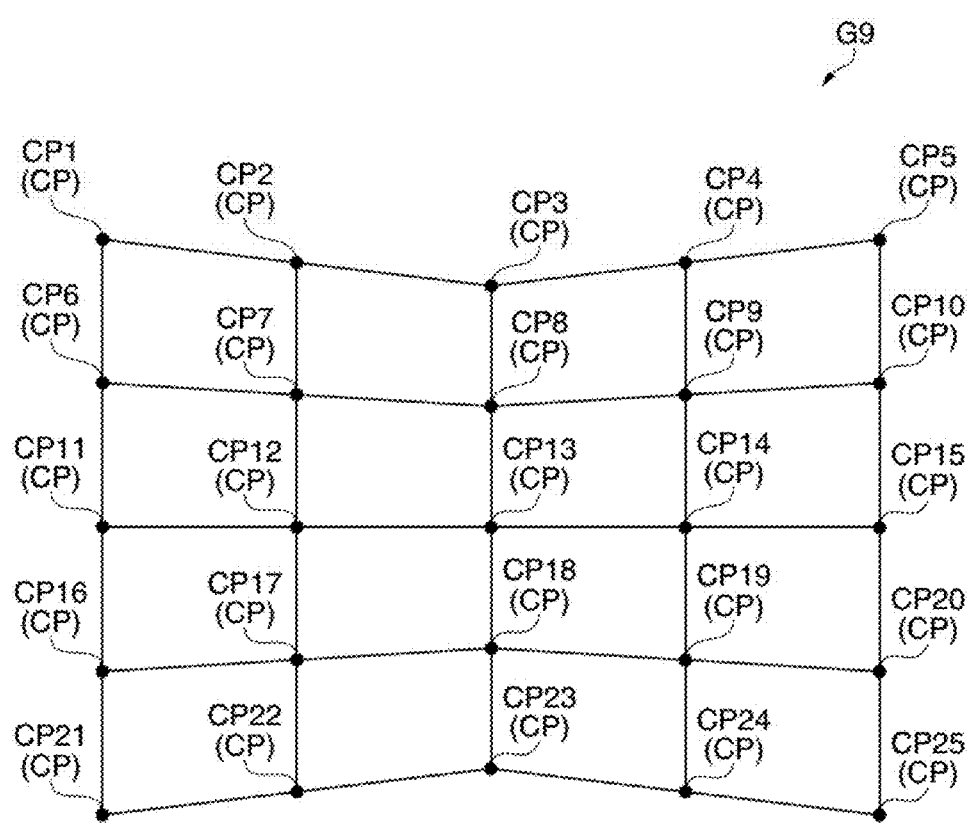
FIG. 11 is a plan view showing an image subjected to the point correction.

FIG. 11 is a plan view showing the image subjected to the point correction.

In FIG. 11, a projected image G9 subjected to the point correction at CP2, CP3, CP4, CP7, CP8, CP9, CP17, CP18, CP19, CP22, CP23, and CP24 among twenty-five control points CP is shown. The control points CP2, CP3, CP4, CP7, CP8, and CP9 are moved by a minus "V moving distance". The control points CP17, CP18, CP19, CP22, CP23, and CP24 are moved by a plus "V moving distance". The sixteen quadrilateral regions QD change to a shape deformed from a rectangle. In the projected image G9, the grid lines and the control points CP are clearly shown to clarify a deformed state of the image.

For example, when the projection surface S is bent in a "chevron" shape as shown in FIG. 1, the user can correct, while projecting an image on the projection surface S, a distortion of the projected image on the projection surface S to a rectangular shape by performing the point correction as applied to the projected image G9.

A pixel region formed on each of the liquid crystal light valves 12R, 12G, and 12B when the point correction is performed as applied to the projected image G9 shown in FIG. 11 is explained.

Figure 12:
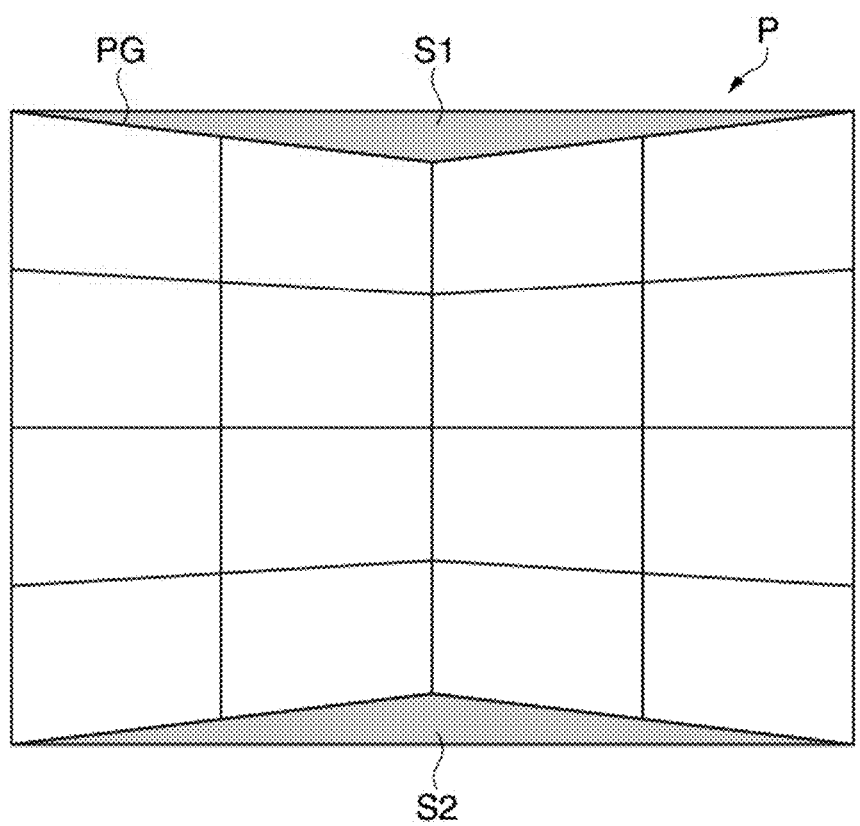
FIG. 12 is a plan view showing a pixel region on a liquid crystal light valve subjected to the point correction.

FIG. 12 is a plan view showing a pixel region on each of the liquid crystal light valves 12R, 12G, and 12B subjected to the point correction.

In FIG. 12, a pixel region P obtained by correcting points on a pixel region equivalent to the control points CP2, CP3, CP4, CP7, CP8, CP9, CP17, CP18, CP19, CP22, CP23, and CP24 of the projected image G9 is shown. In the pixel region P, an image formation region PG distorted in a bent shape is formed. Image data is corrected to be fit in the image formation region PG. Regions S1 and S2 on the outer side of the image formation region PG in the pixel region P are black (a state in which light is hardly transmitted). When such point correction is performed, an image having a bent shape corrected to be fit in the image formation region PG is emitted from the projector 1. In the image formation region PG, grid lines are clearly shown to clarify a deformed state of the image.

According to the embodiment explained above, effects explained below can be obtained.

(1) The user moves the selected control point (vertex), whereby the projector 1 geometrically corrects image data and projects image light based on the corrected image data. Therefore, since the projector alone can perform geometrical shape correction of the image data, convenience is improved. The user can move the control points CP using the direction keys and correct the shape of a projected image while visually recognizing the projected image. Therefore, the user can easily perform the correction of the shape of the projected image even if the user does not have background information.

(2) The projector 1 can change the number of the control points CP according to the number-of-points setting menu image M2. In other words, the projector 1 can change the size of the quadrilateral regions QD. Consequently, the user can change the number of the control points CP to a desired number (i.e., change the size of the quadrilateral regions QD to a desired size) and geometrically correct image data. In other words, since the user can change fineness or roughness for deforming the image data, convenience is improved.

(3) The projector 1 can change a display color of the sides (i.e., the grid lines FR) of the quadrilateral regions QD according to the color pattern setting menu image M3. This is useful because the display color of the grid lines FR can be changed to a color having high visibility according to input image data.

(4) In the projector 1, the selected control point is pointed at by the selected control point guide PGB. The selected control point guide PGB is formed in a shape of a double square, which surrounds the selected control point, and is formed in a shape different from the shape of the control point guide PGA. This is useful because the user can select the control point CP and recognize that the selected control point changes to an adjustable state.

(5) The projector 1 can display, in a display state of the point selection image, the control point selection OSD image OS for urging selection of the selected control point. Consequently, the user can recognize the necessity of selecting the selected control point.

(6) The projector 1 changes, in the display state of the point selection image, a display position of the control point selection OSD image OS not to overlap the selected control point (i.e., the control point CP pointed at by the selected control point guide PGB). Consequently, it is possible to prevent overlap of the selected control point and the control point selection OSD image OS. It is possible to prevent the user from overlooking the selected control point in the point selection image.

(7) The projector 1 displays, in the display state of the point adjustment image, the control point adjustment OSD image OA for urging movement adjustment operation for the selected control point. Consequently, the user can recognize that the selected control point can be moved and adjusted.

(8) The projector 1 can hide, in a state in which the control point adjustment OSD image OA is displayed, the vertexes and/or the sides (i.e., the grid lines FR) of the quadrilateral regions QD. Consequently, it is possible to perform geometrical correction of image data in a state without the grid lines FR and points. This is useful for the user who does not need display of the grid lines FR. After a control point is once selected, when the position of the control point is moved, only an image is displayed. Therefore, it is possible to perform finer correction without displaying grid lines (sides) and points.

(9) The projector 1 can change, in a state in which the control point adjustment OSD image OA is displayed, the background of the point adjustment image from the image data to single-color image data. Consequently, it is possible to improve visibility of the grid lines FR in the display state of the point adjustment image.

(10) In the projector 1, a moving distance from the initial position of the selected control point is displayed in the control point adjustment OSD image OA. This is useful because the user can recognize to which degree the selected control point is moved.

The invention is not limited to the embodiment explained above. The invention can be carried out with various alterations, improvements, and the like. Modifications of the embodiment are explained below.

Modification 1

In the embodiment, the number of the control points CP selectable in the number-of-points setting menu image M2 is "3×3", "5×5", or "9×9". However, the number of the control points CP is not limited to this. For example, when the number of the control points CP is increased, finer correction can be performed.

Modification 2

In the embodiment, the color patterns of the grid lines FR selectable in the color pattern setting menu image M3 are "white", "red", "green", and "yellow". However, the color patterns of the grid lines FR are not limited to this.

Modification 3

In the embodiment, the "H moving distance" and the "V moving distance" are displayed as the moving distance information OA in the control point adjustment OSD image OA. However, the moving distance information OA does not have to be displayed.

Modification 4

In the embodiment, the background image during the point correction is the input image or the single color. However, the background image is not limited to this. A predetermined test pattern stored by the projector alone may be displayed as the background image.

Modification 5

In this embodiment, the moving direction guide OA11 indicating the direction in which the selected control point can be moved is displayed in the control point adjustment OSD image OA. However, a display color of triangles indicating the directions of the moving direction guide OA11 may be set different for the direction in which the selected control point can be moved and a direction in which the selected control point cannot move. Consequently, the user can determine, by visually recognizing a display color of a triangle, whether the selected control point can be moved in a direction indicated by the triangle. Therefore, convenience is improved.

Modification 6

In the embodiment, in the point selection image G2 and the point adjustment image G4, the grid lines FR are displayed as the sides of the quadrilateral regions QD. However, the vertexes of the quadrilateral regions QD may be displayed.

Modification 7

In the embodiment, the moving distances from the initial position are displayed as the "H moving distance" and the "V moving distance" in the moving distance information OA12 of the control point adjustment OSD image OA. However, absolute position information on the pixel region P may be displayed.

Modification 8

In the embodiment, the light source device 11 includes the light source lamp 11a of the discharge type. However, solid-state light sources such as an LED (Light Emitting Diode) light source and a laser or other light sources can be used.

Modification 9

In the embodiment, in the projector 1, the liquid crystal light valves 12R, 12G, and 12B of the transmission type are used as the light modulating devices. However, a light modulating device of a reflection type such as a liquid crystal light valve of the reflection type can also be used. Further, a micro mirror array device or the like can be used that modulates light emitted from a light source by controlling an emitting direction of incident light for each of micro mirrors functioning as pixels.

What is claimed is:

1. A projector comprising:
    a first display control unit that divides image data, which should be displayed, into a plurality of quadrilateral regions and that performs control to display vertexes of the quadrilateral regions to be superimposed on the image data;
    an operation receiving unit that receives input operation;
    a selecting unit that causes a user to select one of the vertexes as a selected control point;
    a moving unit that causes the user to move the selected control point on the basis of the input operation; and
    an image correcting unit that deforms the quadrilateral regions including the selected control point before the movement as one of the vertexes into a shape including, in vertexes, the selected control point moved by the moving unit and corrects image data corresponding to the quadrilateral regions before the deformation to be fit in the deformed quadrilateral regions.

2. The projector according to claim 1, wherein the first display control unit performs control to display sides of the quadrilateral regions.

3. The projector according to claim 1, wherein the first display control unit can change a size of the quadrilateral regions.

4. The projector according to claim 2, wherein the first display control unit can change a display color of the sides of the quadrilateral regions.

5. The projector according to claim 1, wherein the first display control unit displays the selected control point selected by the selecting unit to be different from a state before the selection.

6. The projector according to claim 1, further comprising a second display control unit that performs control to display, when the selecting unit causes the user to select the selected control point, a first OSD image for urging the selection of the selected control point to be superimposed on the image data.

7. The projector according to claim 6, wherein the second display control unit changes a display position of the first OSD image in the image data not to overlap the selected control point.

8. The projector according to claim 1, further comprising a third display control unit that performs control to display, when the selected control point is selected by the selecting unit, a second OSD image for urging moving operation for the selected control point to be superimposed on the image data.

9. The projector according to claim 8, wherein a moving distance from an initial position of the selected control point is displayed on the second OSD image.

10. The projector according to claim 1, wherein the first display control unit can change the vertexes of quadrilateral regions not to be displayed when the operation receiving unit receives predetermined input operation after the selecting unit selects the selected control point.

11. The projector according to claim 1, wherein the first display control unit can change the image data to a single color image.

12. The projector according to claim 2, wherein the first display control unit can change the vertexes and/or sides of quadrilateral regions not to be displayed when the operation receiving unit receives predetermined input operation after the selecting unit selects the selected control point.

13. A control method for a projector comprising:

dividing image data, which should be displayed, into a plurality of quadrilateral regions;

displaying vertexes of the quadrilateral regions, which are divided in the dividing, to be superimposed on the image data;

causing a user to select one of the vertexes as a selected control point;

causing the user to move the selected control point on the basis of the input operation; and deforming the quadrilateral regions including the selected control point before the movement as one of the vertexes into a shape including, in vertexes, the moved selected control point and correcting image data corresponding to the quadrilateral regions before the deformation to be fit in the deformed quadrilateral regions.

* * * * *